(12) United States Patent
Hirayama et al.

(10) Patent No.: US 8,044,131 B2
(45) Date of Patent: Oct. 25, 2011

(54) RUBBER COMPOSITION FOR TREAD AND TIRE COMPRISING THEREOF

(75) Inventors: Tomoaki Hirayama, Kobe (JP); Takao Wada, Kobe (JP); Mamoru Uchida, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 30 days.

(21) Appl. No.: 11/325,569

(22) Filed: Jan. 5, 2006

(65) Prior Publication Data

US 2006/0167165 A1 Jul. 27, 2006

(30) Foreign Application Priority Data

Jan. 21, 2005 (JP) ................................. 2005-014099

(51) Int. Cl.
C08K 3/36 (2006.01)
C08L 9/00 (2006.01)
B60C 1/00 (2006.01)
B60C 11/00 (2006.01)
C08F 36/08 (2006.01)

(52) U.S. Cl. ............ 524/493; 524/847; 524/9; 524/313; 524/575.5; 524/572; 524/571; 524/495; 525/333.1; 525/232; 525/354; 525/343; 152/209.1

(58) Field of Classification Search .................. 524/493, 524/492, 495, 572, 575.5, 847, 9, 313; 152/209.1; 525/331.9
See application file for complete search history.

(56) References Cited

U.S. PATENT DOCUMENTS

| | | | | |
|---|---|---|---|---|
| 3,873,489 A * | 3/1975 | Thurn et al. | ................... | 524/262 |
| 5,396,940 A * | 3/1995 | Segatta et al. | ............... | 152/209.4 |
| 5,462,979 A * | 10/1995 | Sandstrom | ..................... | 523/438 |
| 5,475,051 A * | 12/1995 | Machurat | ..................... | 524/519 |
| 5,504,140 A | 4/1996 | Zanzig et al. | | |
| 5,846,506 A | 12/1998 | Esch et al. | | |
| 5,925,708 A | 7/1999 | Esch et al. | | |
| 6,268,424 B1 | 7/2001 | Blume et al. | | |
| 6,448,318 B1 * | 9/2002 | Sandstrom | ..................... | 524/284 |
| 6,977,065 B1 | 12/2005 | Esch et al. | | |
| 7,144,465 B2 * | 12/2006 | Nahmias Nanni et al. | | 156/110.1 |
| 7,152,642 B2 * | 12/2006 | Serra et al. | ................. | 152/209.5 |
| 7,285,584 B2 * | 10/2007 | Hsu et al. | ....................... | 523/213 |
| 7,709,560 B2 * | 5/2010 | Yagi et al. | ..................... | 523/438 |
| 7,741,382 B2 * | 6/2010 | Hochi | ............................. | 523/155 |
| 2002/0169248 A1 | 11/2002 | Esch et al. | | |
| 2003/0075253 A1 * | 4/2003 | Serra et al. | ..................... | 152/525 |
| 2004/0045650 A1 * | 3/2004 | Serra et al. | ................. | 152/209.5 |
| 2004/0099358 A1 * | 5/2004 | Nahmias Nanni et al. | ... | 152/151 |
| 2004/0266937 A1 * | 12/2004 | Yagi et al. | ..................... | 524/493 |
| 2005/0016651 A1 * | 1/2005 | Durel et al. | ................. | 152/209.1 |
| 2005/0209390 A1 * | 9/2005 | Yagi et al. | ..................... | 524/493 |
| 2005/0282951 A1 | 12/2005 | Esch et al. | | |
| 2006/0079643 A1 * | 4/2006 | Serra et al. | ..................... | 525/107 |
| 2006/0205858 A1 * | 9/2006 | Hirayama et al. | ............ | 524/493 |
| 2006/0231183 A1 * | 10/2006 | Serra et al. | ................. | 152/209.1 |
| 2007/0137753 A1 * | 6/2007 | Hirayama et al. | ............ | 152/510 |

FOREIGN PATENT DOCUMENTS

| | | | |
|---|---|---|---|
| CN | 1085228 A | | 4/1994 |
| CN | 1127188 A | | 7/1996 |
| EP | 0 704 481 A1 | | 4/1996 |
| EP | 1 484 359 A1 | | 12/2004 |
| EP | 1 484 359 A1 | * | 12/2004 |
| JP | 7-149955 A | | 6/1995 |
| JP | 7-172815 | | 7/1995 |
| JP | 8-277348 A | | 10/1996 |
| JP | 11-269307 A | | 10/1999 |
| JP | 2000-109612 A | | 4/2000 |
| JP | 2002-533234 A | | 10/2002 |
| JP | 2003-213041 A | | 7/2003 |
| JP | 2004-530783 A | | 10/2004 |
| JP | 2005-263956 | * | 9/2005 |
| WO | WO-00/37555 A1 | | 6/2000 |
| WO | WO 00/37555 A1 | * | 6/2000 |
| WO | WO-01/14470 A1 | | 3/2001 |

OTHER PUBLICATIONS

Yagi, Norkio JP 2005-263956 (Sep. 2005); abstract and translation in English.*

Decision of Rejection issued on Jan. 26, 2010 in corresponding Japanese Patent Application No. 2005-014099, and partial English translation thereof.

* cited by examiner

Primary Examiner — Rip A. Lee
(74) Attorney, Agent, or Firm — Birch, Stewart, Kolasch & Birch, LLP

(57) ABSTRACT

There is provided a rubber composition for a tread having excellent hardness and improving the processability and grip performance of a tire, and a tire comprising thereof. A rubber composition for a tread comprising 30 to 80 parts by weight of silica having a BET specific surface area of less than 150 m²/g and 10 parts by weight or less of carbon black based on 100 parts by weight of a rubber component comprising an epoxidized natural rubber, and a tire comprising thereof.

2 Claims, No Drawings

RUBBER COMPOSITION FOR TREAD AND TIRE COMPRISING THEREOF

BACKGROUND OF THE INVENTION

The present invention relates to a rubber composition for a tread and a tire comprising thereof.

A rubber composition compounded with 100% by weight of a natural rubber has been conventionally used as a rubber composition for producing the tread of a tire (rubber composition for a tread). However, in this case, since the grip force of the obtained tire is low, the grip force was controlled to be improved by further mixing a rubber component comprising petroleum resources such as a styrene-butadiene rubber together with the natural rubber as the rubber component.

However, in the recent years, the regulation for $CO_2$ discharge has become tighter as environmental problems have been considered more, and the limited crude petroleum supply has been decreasing year by year. Thus, the inflation of oil price in the future is predicted, and there is a limitation in using materials, such as a styrene-butadiene rubber and carbon black, made of petroleum resources. Accordingly, assuming the depletion of petroleum in future, it is necessary to use resources other than petroleum such as a natural rubber and white fillers such as silica and calcium carbonate. However, in that case, there are required performances which are the same as or more of tread performance (for example, the grip performance of a tire) and the hardness and processability of a rubber composition for a tread which are obtained by using petroleum resources conventionally used.

In order to improve the fore-mentioned performances using resources other than petroleum, for example, a method for producing a rubber composition for a tread which contains an epoxidized natural rubber being a resource other than petroleum as a rubber component is disclosed in Japanese Unexamined Patent Publication No. 2002-533234. However, since BET specific surface area of silica compounded in the rubber composition is large, processability at production of tires was inferior.

SUMMARY OF THE INVENTION

It is the object of the present invention to provide a rubber composition for a tread having excellent hardness and improving processability and grip performance of a tire, and a tire comprising thereof.

The present invention relates to a rubber composition for a tread comprising 30 to 80 parts by weight of silica having a BET specific surface area of less than 150 $m^2/g$ and 10 parts by weight or less of carbon black based on 100 parts by weight of a rubber component comprising an epoxidized natural rubber.

An amount of the epoxidized natural rubber in the rubber component is preferably 50% by weight or more.

Further, the present invention relates to a tire comprising the rubber composition for a tire.

DETAILED DESCRIPTION

The rubber composition for a tread of the present invention contains a rubber component, silica and carbon black.

The rubber component comprises an epoxidized natural rubber (ENR).

ENR is produced by adding an epoxidation agent such as peracetic acid in an emulsion of a natural rubber to be reacted. ENR used in the present invention is not specifically limited, but specifically includes ENR in which an epoxidation ratio is 25% (ENR25) and 50% (ENR50), and the like. Additionally, ENR having a different epoxidation ratio can be also used. These ENR's may be used alone or in a combination use of two or more.

In the rubber component, the content ratio of ENR is preferably 50% by weight or more, more preferably 70% by weight or more, and further preferably 80% by weight or more. When the content ratio of ENR is less than 50% by weight, grip performance tends to be lowered. Further, the content of ENR is preferably 100% by weight in particular.

As the rubber component, rubber components which are generally used in the rubber industry can be used in combination with ENR, but among these, a combination of NR and ENR is preferable because it is gentle for environment because of comprising a component other than petroleum and further lowering of rolling resistance and improvement of grip performance can be achieved in good balance.

When NR and ENR are used in a combination, the content of ENR in the rubber component is preferably 50% by weight or less, more preferably 30% by weight or less and further preferably 20% by weight or less. When the content of ENR exceeds 50% by weight, grip performance tends to be lowered.

BET specific surface area of silica is less than 150 $m^2/g$ and preferably 130 $m^2/g$ or less. When BET specific surface area is more than 150 $m^2/g$, processability becomes deteriorated. Further, BET specific surface area of silica is preferably 60 $m^2/g$ or more and more preferably 80 $m^2/g$ or more. When BET specific surface area is less than 60 $m^2/g$, abrasion resistance performance tends to be lowered.

The content of silica is 30 parts by weight or more based on 100 parts by weight of the rubber component and preferably 50 parts by weight or more. When the content is less than 30 parts by weight, the grip performance is insufficient. Further, the content of silica is 80 parts by weight or less and preferably 70 parts by weight or less. When the content exceeds 80 parts by weight, processability and grip performance cannot be improved in good balance.

As carbon black, carbon black such as N220, N234, N330, N351 and N550 which has the specification generally used in the tire industry can be used. Among these, N220 carbon black is preferable because appropriate blackening of a tire or improvement of weather resistance can be achieved.

The content of carbon black is 10 parts by weight or less based on 100 parts by weight of the rubber component and preferably 6 parts by weight or less. When the content exceeds 10 parts by weight, it is not preferable because the ratio of petroleum resources is increased in the rubber composition. Further, the content of carbon black is preferably 2 parts by weight or more and more preferably 4 parts by weight or more. When the content is less than 2 parts by weight, a problem tends to occur that blackening of a tire is not sufficient or weather resistance is lowered, or the like.

In the rubber composition for a tread of the present invention, a silane coupling agent can be used in a combination with silica. The silane coupling agent is not specifically limited, but specific examples include sulfides series such as bis(3-triethoxysilylpropyl) tetrasulfide, bis(2-triethoxysilylethyl) tetrasulfide, bis(3-trimethoxysilylpropyl)tetrasulfide, bis(2-trimethoxysilylethyl) tetrasulfide, bis(3-triethoxysilylpropyl) trisulfide, bis(3-trimethoxysilylpropyl) trisulfide, bis(3-triethoxysilylpropyl) disulfide, bis(3-trimethoxysilylpropyl) disulfide, 3-trimethoxysilylpropyl-N,N-dimethylthiocarbamoyl tetrasulfide, 3-triethoxysilylpropyl-N,N-dimethylthiocarbamoyl tetrasulfide, 2-triethoxysilylethyl-N,N-dimethylthiocarbamoyl tetrasulfide, 3-trimethoxysilylpropylbenzothiazolyl tetrasulfide, 3-triethoxysilylpropylbenzothiazolyl tetrasulfide, 3-triethoxysilylpropyl methacrylate monosulfide and 3-trimethoxysilylpropyl methacrylate monosulfide; mercapto series such as 3-mercaptopropyltrimethoxysilane, 3-mercaptopropyltriethoxysilane, 2-mercaptoethyltrimethoxysilane and 2-mercaptoethyltriethoxysilane; vinyl series such as vinyl triethoxysilane and vinyl trimethoxysilane; amino series such as 3-aminopropyltriethoxysilane, 3-aminopropyltrimethoxysilane, 3-(2-aminoethyl)aminopropyltriethoxysilane and 3-(2-aminoethyl)aminopropyltrimethoxysilane; glycidoxy series such as γ-glycidoxypropyltriethoxysilane, γ-glycidoxypropyltrimethoxysilane, γ-glycidoxypropylmethyldiethoxysilane and γ-glycidoxypropylmethyldimethoxysilane; nitro series such as 3-nitropropyltrimethoxysilane and 3-nitropropyltriethoxysilane; chloro series such as 3-chloropropyltrimethoxysilane, 3-chloropropyltriethoxysilane, 2-chloroethyltrimethoxysilane and 2-chloroethyltriethoxysilane. These silane coupling agents may be used solely or in a combination use of two or more. Further, the silane coupling agent can be used in a general compounding amount.

The rubber composition for a tread of the present invention can contain oil as a softener. As the oil, process oil, plant oil and fat or a mixture thereof may be used.

The process oil includes specifically, paraffin process oil, naphthene process oil, and aromatic process oil.

Further, the plant oil and fat includes specifically ricinus oil, cotton seed oil, linseed oil, rape seed oil, soy bean oil, palm oil, coconut oil, peanut oil, rosin, pine oil, pine tar, tall oil, corn oil, rice oil, saffron oil, sesame oil, olive oil, sun flower oil, palm kernel oil, camellia oil, jojoba oil, macadamia nut oil, safflower oil, wood oil.

In the rubber composition for a tread of the present invention, various fillers such as wax, an antioxidant, stearic acid, zinc oxide, sulfur, and a vulcanization accelerator which are usually used in the tire industry can be suitably compounded, if necessary, in addition to the rubber component, silica, carbon black, a silane coupling agent and a softener.

The tire of the present invention comprises the rubber composition for a tread of the present invention and in particular, has preferably a tread comprising the rubber composition for a tread.

The tire of the present invention can be produced by a usual method using the rubber composition for a tread of the present invention. Namely, the rubber composition for a tread of the present invention in which the fore-mentioned rubber component, silica and carbon black, if necessary, a silane coupling agent and the fore-mentioned various additives is extruded and molded in match with the shape of a tire tread at an uncured stage and molded by a usual method on a tire molding machine to form uncured tires. Tires can be produced by pressuring the uncured tires in a vulcanization machine by heating.

EXAMPLES

The present invention is specifically explained based on Examples, but the present invention is not limited thereto.

Various chemicals used in Examples are described below.
NR: TSR
ENR25: Epoxidized Natural Rubber (an epoxidation ratio of 25% by mol) manufactured by Kumpulan Guthrie Berhad Co. (Malaysia).
Carbon black: SHOWBLACK N220, manufactured by SHOWA CABOT K. K.
Silica A: ULTRASIL VN2 manufactured by Degussa Corporation (BET specific surface area: 125 m²/g).
Silica B: ULTRASIL VN3 manufactured by Degussa Corporation (BET specific surface area: 210 m²/g).
Silane coupling agent: Si75 manufactured by Degussa Japan.
Oil: Soy Bean Oil manufactured by Nissin Oillio Group Co.
Wax: SUNNOC WAX, manufactured by OUCHISHINKO CHEMICAL INDUSTRIAL CO., LTD.
Antioxidant: NOCRAC 6C
(N-(1,3-dimethylbutyl)-N'-phenyl-phenylenediamine) manufactured by OUCHISHINKO CHEMICAL INDUSTRIAL CO., LTD.
Stearic acid: STEARIC ACID manufactured by NOF Corporation.
Zinc oxide: ZINC OXIDE No. 1 manufactured by Mitsui Mining And Smelting Corporation, Limited.
Sulfur: SULFUR POWDER manufactured by Tsurumi Chemical Industry Co., Ltd.
Vulcanization accelerator NS: NOCCELER CZ manufactured by OUCHISHINKO CHEMICAL INDUSTRIAL CO., LTD.

Examples 1 to 5 and Comparative Examples 1 to 3

After the fore-mentioned various chemicals excluding sulfur and a vulcanization accelerator which were described in Table 1 were kneaded with 1.7 L Banbury mixer manufactured by Kobe Steel Ltd., sulfur and the vulcanization accelerator were compounded and kneaded with an open roll to obtain uncured products.

(Extrusion Processability)

The shape of texture of rubber sheets (uncured products) which were extruded with an extruder was visually observed. Those having problems such as notch were evaluated as x and those having no problem were evaluated as ○.

<Production of Rubber Composition>

Measurement test was carried out below using the rubber compositions which were obtained by vulcanizing the fore-mentioned uncured products at 150° C. for 30 min.

(Hardness)

Hardness of the fore-mentioned rubber compositions at 25° C. were measured using a JIS-A hardness meter.

<Production of Tires>

The fore-mentioned uncured products were molded into a tread shape on a tire molding machine and they were laminated with other tire members to prepare uncured tires. Tires were produced by vulcanizing them at 150° C. for 30 min. The obtained tires were used to carry out test below.

(Grip Performance)

The grip performance was evaluated based on braking performance which was obtained by Anti Lock Brake System (ABS) evaluation test. Namely, the fore-mentioned tires were mounted on a vehicle of 1800 cc class on which ABS was installed, in-vehicle running by the vehicle was carried out on asphalt road surface (wet road surface state; skid No. is about 50), the brake was applied at a time of 100 km/h, and deceleration rate until the vehicle stopped was calculated. Further, the deceleration rate in Example 1 was referred to as 100, the deceleration rates of other Examples and Comparative Examples were indicated by indices. It is indicated that the larger the index is, the better the braking performance and the high the grip performance is.

The test results are shown in Table 1.

TABLE 1

| | Example | | | | | Comparative Example | | |
|---|---|---|---|---|---|---|---|---|
| | 1 | 2 | 3 | 4 | 5 | 1 | 2 | 3 |
| Compounding amount (parts by weight) | | | | | | | | |
| NR | 50 | — | — | 60 | — | 100 | — | — |
| ENR25 | 50 | 100 | 100 | 40 | 100 | — | 100 | 100 |
| Carbon black | 5 | 5 | 5 | 5 | 5 | 5 | 5 | 5 |
| Silica A | 75 | 75 | 55 | 75 | 45 | 75 | 85 | — |
| Silica B | — | — | — | — | — | — | — | 55 |
| Silane coupling agent | 6 | 6 | 4.4 | 6 | 3.6 | 6 | 6.8 | 4.4 |
| Oil | 15 | 15 | 5 | 15 | 0 | 15 | 25 | 5 |
| Wax | 1.5 | 1.5 | 1.5 | 1.5 | 1.5 | 1.5 | 1.5 | 1.5 |
| Antioxidant | 2 | 2 | 2 | 2 | 2 | 2 | 2 | 2 |
| Stearic acid | 2 | 2 | 2 | 2 | 2 | 2 | 2 | 2 |
| Zinc oxide | 3 | 3 | 3 | 3 | 3 | 3 | 3 | 3 |
| Sulfur | 1.5 | 1.5 | 1.5 | 1.5 | 1.5 | 1.5 | 1.5 | 1.5 |
| Vulcanization accelerator NS | 2.0 | 2.0 | 2.0 | 2.0 | 2.0 | 2.0 | 2.0 | 2.0 |
| Evaluation result | | | | | | | | |
| Extrusion processability | ○ | ○ | ○ | ○ | ○ | ○ | X | X |
| Grip performance | 100 | 115 | 105 | 95 | 95 | 75 | 120 | 105 |
| Hardness | 60 | 61 | 58 | 60 | 57 | 59 | 60 | 59 |

In Examples 1 to 5, the extrusion processability of a rubber sheet and the hardness of the rubber composition are good and further, the grip performance which was obtained by preparing treads using the rubber compositions is also good.

In Comparative Example 1 in which the content of ENR in the rubber component is less than 50% by weight, the grip performance of a tire is low.

In Comparative Example 2 in which silica is used in a large amount, the extrusion processability of a rubber sheet is poor.

In Comparative Example 3 in which silica having a large BET specific surface is contained, the extrusion processability of a rubber sheet is poor.

According to the present invention, there can be provided a rubber composition for a tread having excellent hardness and improving processability and grip performance of a tire, by containing a rubber component comprising an epoxidized natural rubber, silica having a low BET specific surface area, and a small amount of carbon black, and a tire comprising thereof.

What is claimed is:

1. A tire having a tread, said tread comprising a rubber composition comprising 50 to 80 parts by weight of silica having a BET specific surface area of 80 to 130 $m^2/g$, 4 to 6 parts by weight of carbon black, 5 to 15 parts by weight of plant oil as a softener, and sulfur and a vulcanization accelerator, based on 100 parts by weight of a rubber component comprising an epoxidized natural rubber,
   wherein the amount of the epoxidized natural rubber in the rubber component is 100% by weight.

2. The tire having a tread according to claim 1, wherein the amount of silica having a BET specific surface area of 80 to 130 $m^2/g$ is 50 to 75 parts by weight.

* * * * *